United States Patent [19]

Endriz

[11] 4,001,620

[45] Jan. 4, 1977

[54] MODULATION MASK FOR AN IMAGE DISPLAY DEVICE

[75] Inventor: John Guiry Endriz, Plainsboro, N.J.

[73] Assignee: RCA Corporation, New York, N.Y.

[22] Filed: Dec. 17, 1975

[21] Appl. No.: 641,631

[52] U.S. Cl. .......................... 313/105 R; 313/400; 313/403; 313/411; 315/169 TV

[51] Int. Cl.² .......................... A01J 43/00

[58] Field of Search ....... 313/103 R, 103 CM, 104, 313/105 R, 105 CM, 329, 395, 400, 402, 403, 411, 495; 315/169 TV

[56] References Cited

UNITED STATES PATENTS

| | | | |
|---|---|---|---|
| 2,951,175 | 8/1960 | Null | 313/329 X |
| 3,904,923 | 9/1975 | Schwartz | 313/103 R X |

*Primary Examiner*—Robert Segal
*Assistant Examiner*—Lawrence J. Dahl
*Attorney, Agent, or Firm*—Glenn H. Bruestle; Carl L. Silverman

[57] ABSTRACT

A metal sheet is provided with a plurality of slots which are disposed in parallel rows and columns. Charge sensing pads are disposed on an insulating layer on one surface of the metal sheet with a separate pair of the charge sensing pads being in abutting relation and sandwiching a separate slot. The sensing pads have a capacitance to the metal sheet such that they can be electrically charged to a common voltage level which permits a substantially uniform maximum electrical charge to pass into each one of the slots when the abutting sensing pads are discharged by line electron sources. The charge sensing pads may be repetitively charged, i.e., brought back to the common voltage level, through resistive leakage to a body at that common voltage. A plurality of substantially parallel modulating electrodes are disposed on, but insulated from, the other surface of the metal sheet. Each one of the modulating electrodes extends around one of the parallel columns of slots. The modulating electrodes control the charge which exits from each one of the slots during a charge-discharge cycle. The modulation mask is suitable for use with line electron sources to form a display having desirable characteristics. The modulation mask can be used in conjunction with feedback multiplier line sources as long as high energy electrons are eliminated through the use of high energy electron filters.

28 Claims, 12 Drawing Figures

MODULATION MASK FOR AN IMAGE DISPLAY DEVICE

BACKGROUND OF THE INVENTION

This invention relates to an image display device, and particularly to a modulation mask for a flat cathodoluminescent image display device.

One form of a flat image display device which has been developed includes a multiplicity of cells. Each of the cells includes all the necessary components for forming at least a single element of an image display. Typically, each cell includes a source of electrons hereinafter referred to as the cathode, means for modulating a flow of electrons from the cathode, means for accelerating and focussing the flow of electrons, and a cathodoluminescent screen excitable by the accelerated flow of electrons. The device is operated by suitably addressing the cells in a desired sequence, e.g., a typical television scan.

In order to form a display having desirable characteristics, the flow of electrons must be accurately modulated. Typically, on-off modulation of a cell can be easily accomplished. However, gray-scale modulation, i.e., a selective gradation of the number of electrons permitted to strike the screen, is much more difficult to achieve. This is especially true in those circumstances wherein cathodoluminescent flat planel display schemes should simultaneously satisfy the requirements of about 1 percent element-to-element uniformity, high color purity, simple drive circuit requirements, low cost, and ease of construction. In addition, in such a flat image display device, large area cathodes generally have nonuniform output currents and require a modulation scheme using sampling and control of charge, rather than control of current, to display uniformity.

Thus, the extended nature of the cathode in such a flat image display device can necessitate at least one charge sensing electrode for each one of the elements per display line, e.g., about 1800 to 2200 per line for a color display. The extended cathode also requires a given modulating electrode to provide access to every one of the approximately 500 display lines, i.e., each modulating electrode should have a length equal to the full image height. In a simple vertical charge sensing grid system of modulation, the modulating electrode and the charge sensing electrode are one and the same. However, this approach imposes a fundamental lower limit on the charge sensing electrode capacitance since the modulating electrode must extend for the full panel height if it is to modulate all 500 lines. In addition, the electrode must be a sizable fraction of the picture element width, if charge sensing is to be accurate and/or if line source current demands are not made excessive. The fundamental lower limit on the electrode capacitance in such a scheme results in a useless and excessive power loss in charging the modulating electrodes since line sources generally require relatively high voltages for modulation. Accurate sensing in such a scheme can require greater than an order of magnitude more line source charge than is necessary to achieve desired brightness levels.

Therefore, it would be desirable to develop a means for modulation i.e., a charge sensing modulation mask, in a flat image display device which can form a display having desirable characteristics without demanding an excessive amount of line source charge.

SUMMARY OF THE INVENTION

A substantially planar modulation mask for an image display device includes a metal sheet having a plurality of substantially identical apertures which are disposed in parallel rows and columns. A plurality of segmented charge sensing pads are disposed on, but insulated from, one surface of the metal sheet such that at least one of the sensing pads is in abutting relation with each of the apertures. Each of the sensing pads is disposed between the columns of apertures and extends for less than the full number of the rows of apertures. A plurality of substantially parallel modulating electrodes are disposed on, but insulated from, the other surface of the metal sheet with each one of the modulating electrodes extending around one of the parallel columns of apertures.

DETAILED DESCRIPTION OF THE INVENTION

Figure 1:
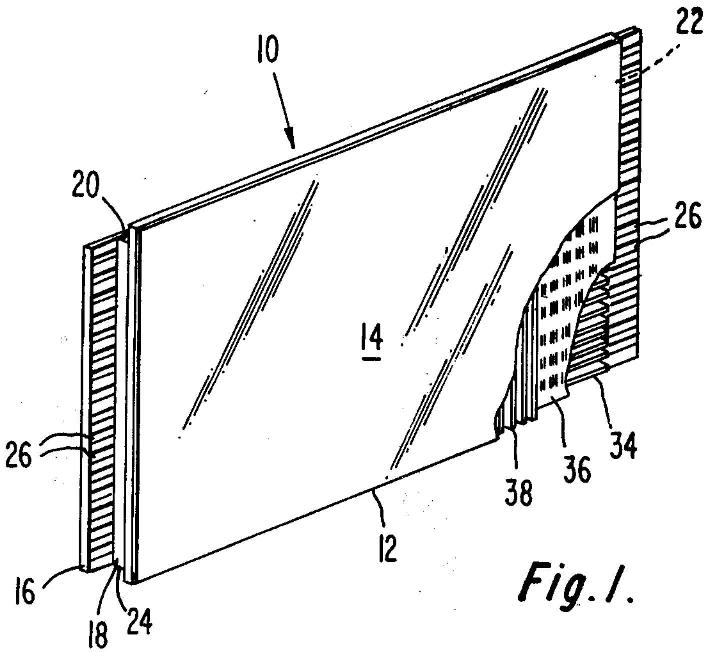
FIG. 1 is a partially broken away isometric view of an image display device which utilizes the modulation mask of the present invention.

One embodiment of a complete image display device 10 which employs the modulation mask of the present invention is shown in FIG. 1. The device 10 includes an evacuated glass envelope 12 having a flat transparent viewing front panel 14 and a flat back panel 16. The front and back panels 14 and 16 are parallel to each other and are sealed together by peripheral sidewalls 18, 20, 22 and 24. Sidewalls 18 and 22 include terminal areas whch include a series of electrically conductive electrodes 26 extending therethrough to provide electrical conduction means for activating and controlling the device 10. In one embodiment, the overall dimensions of the device 10 are 75 cm high by 100 cm wide by 2.5 cm thick. The device 10 may have several different internal structures with at least one common property; the particular internal structure selected must be capable of supporting the front and back panels 14 and 16 of the glass envelope 12 against atmospheric pressures when the glass envelope 12 is evacuated.

Figure 2:
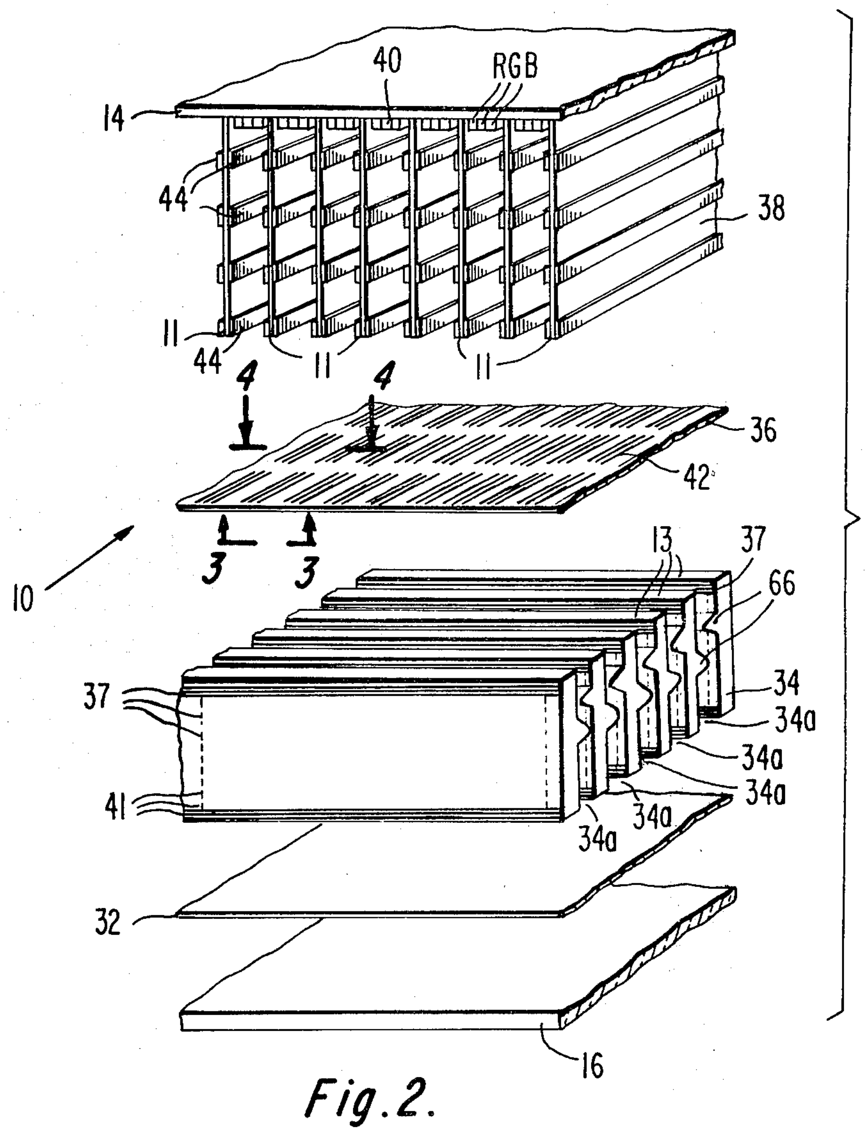
FIG. 2 is an exploded view of the image display device of FIG. 1.

The image display device 10 includes two orthogonal sets of parallel insulating vanes positioned between the front panel 14 and the back panel 16, as shown in FIG. 2. One set comprises vanes designated as 11; the other set comprises vanes designated as 13. A modulation mask 36 of the present invention is sandwiched between the two sets of orthogonal vanes 11 and 13. A large area cathode 32 is supported by the back panel 16. The cathode 32 may be a photoemissive material, such as barium, where optical feedback is employed as a means of sustaining cathode electron emission. High ion secondary emission cathode materials are suitable in situations where ion feedback is desirable as a means of sustaining cathode electron emission. The device 10 may be described as including a plurality of cells, or picture elements, each of which correspond to the intersections of the two orthogonal sets of vanes 11 and 13 respectively, and a modulation mask 36 therebetween.

The parallel vanes 13 function as an electron multiplier section 34. The multiplier section 34 is divided into a plurality of electron multipliers which are determined by each consecutive pair of vanes 13. The multiplier section 34 may be referred to as including a plurality of line electron multipliers 34*a*. The line multipliers 34*a* each include a plurality of dynodes 41 disposed on the opposing surfaces between each pair of vanes 13. The geometric configuration of the dynodes 41 is such that electrons emitting from the surface of one dynode are steered to the surface of the next dynode when appropriate voltages are applied. The dynodes 41 are of a material having a high secondary emission ratio $\delta$, e.g., magnesium oxide ($\delta$ greater than 2.0).

Each of the line multipliers 34*a* includes a plurality of electrodes 37 which extend parallel to its major axis. The electrodes 37 are disposed on the opposing surfaces between each pair of vanes 13. One pair of these electrodes 37, further designated as potential barrier electrodes 37*b*, is disposed at one end of the line multiplier 34*a* in proximate relation to the modulation mask 36, as shown in FIG. 7.

Figure 7:
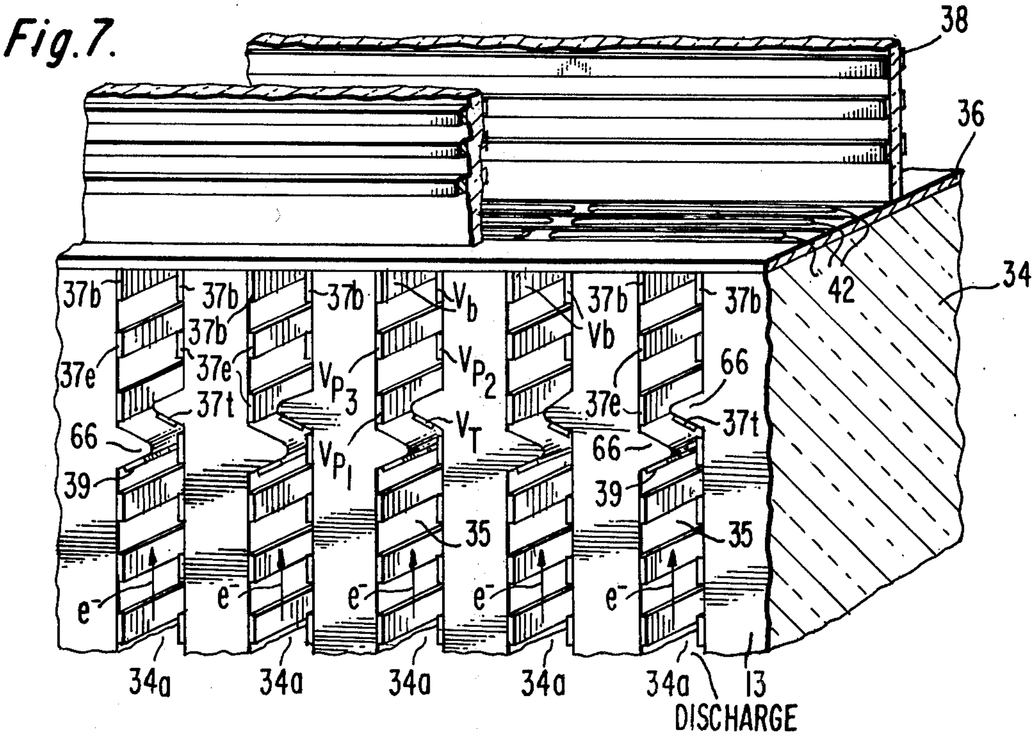
FIG. 7 is a partially broken away isometric view of a portion of the image display device of FIG. 1.
Figure 6:
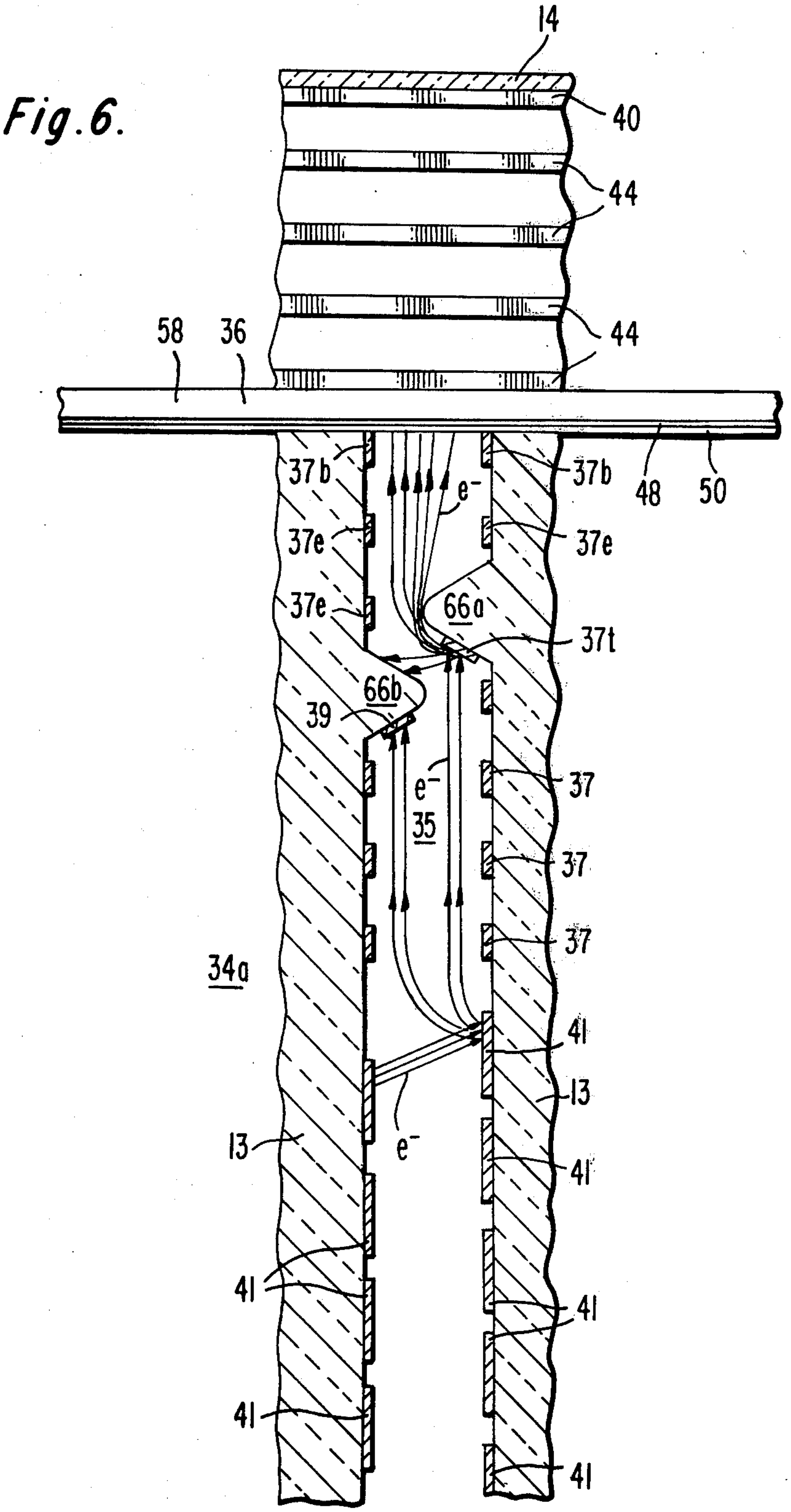
FIG. 6 is a sectional view of one cell in the image display device of FIG. 1 showing the mechanism by which a line source of electrons is achieved.

Each of the line multipliers 34*a* includes a high energy electron filter 66 as shown in FIGS. 6 and 7. The filter 66 is defined by protrusions 66*a* and 66*b* which extend from the vanes 13, as clearly shown in FIGS. 6 and 7. The shape of the protrusions 66*a* and 66*b* is such that the filter 66 is optically opaque, i.e., there is no straight path there-through. An electrode 37, further designated as target electrode 37*t* is disposed on the surface of the protrusion 66*a* which faces the protrusion 66*b*. Others of the electrodes 37, further designated as extract electrodes 37*e*, are disposed between the potential barrier electrodes 37*b* and the filter 66. The surface of the protrusion 66*b* which faces into the line multiplier 34*a* can be coated with a body 39 of a material which will create photon feedback to the cathode 32. For example, the body 39 may be a conventional phosphor material, such as lanthanum phosphate, cerium doped.

The other set of parallel vanes 11 functions as the accelerating and focussing section 38, as shown in FIG. 2. The accelerating and focussing section 38 may be a relatively open structure which is sandwiched between the cathodoluminescent screen 40 and the modultion mask 36. The screen 40 comprises parallel phosphor stripes which are located on the inner surface of the front panel 14. Several phosphor stripes, e.g., Red (R), Green (G), and Blue (B), are disposed between each consecutive pair of parallel vanes 11. The phosphor stripes are parallel with the vanes 11 of the accelerating and focussing section 38. A plurality of electrodes 44 are disposed on the opposing surfaces between each consecutive pair of vanes 11.

The modulation mask 36 is a substantially planar body having a plurality of identical apertures 42 therein, preferably in the form of slots, which are disposed in parallel rows and columns, as shown in FIG. 2. The columns of slots 42 are disposed with their major axes aligned with the corresponding phosphor stripes of the cathodoluminescent screen 40. Each consecutive pair of vanes 11 in the accelerating and focussing section 38 includes three columns of slots 42 and the three corresponding phosphor stripes, although greater or lesser numbers of stripes and slots may be included. The slots 42 are of a length ($L_s$) at least sufficient to equal the opening defined by each line multiplie 34*a* and are of a width ($W_s$) sufficient to correspond to each of the phosphor stripes as shown in FIG. 3.

Figure 5:
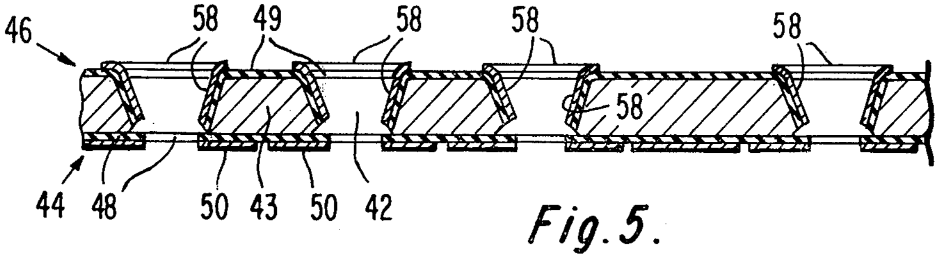
FIG. 5 is an enlarged cross-sectional view of the modulation mask taken along line 5—5 of FIG. 3.

The modulation mask 36 includesa substantially planar thin metal sheet 43, e.g., less than 0.25 mm thick, as can be more clearly seen in FIG. 5. Suitable materials include those which can be conveniently worked and which are electrically conductive, e.g., aluminum or aluminum-magnesium alloys. For purposes of description, the sheet 43 includes surfaces 44 and 46. The slots 42 in the sheet 43 are narrower at the surface 44 than at the surface 46 so that the sides of the slots taper away in the slot. The slots 42, for example, may have a width ($W_s$) of 75 microns (at surface 44), 125 microns (at surface 46) and a length ($L_s$) of 3.0 mm.

On the surfaces 44 and 46 of the sheet 43 are insulating layers 48 and 49, respectively, as shown in FIG. 5. The insulating layer 48 is of a material which is a relatively poor insulator, i.e., having a resistivity between about $10^6$ ohm-cm to about $10^{11}$ ohm-cm, such as aluminum nitride. Typically, the insulating layer 48 has a thickness of between about 1 micron to about 25 microns. In contrast to the insulating layer 48, the insulating layer 49 is a relatively good insulator, e.g., having a resistivity which approaches infinity, such as aluminum oxide. Typically, the thickness of the insulating layer 49 ranges from about 10 microns to about 75 microns.

Figure 3:
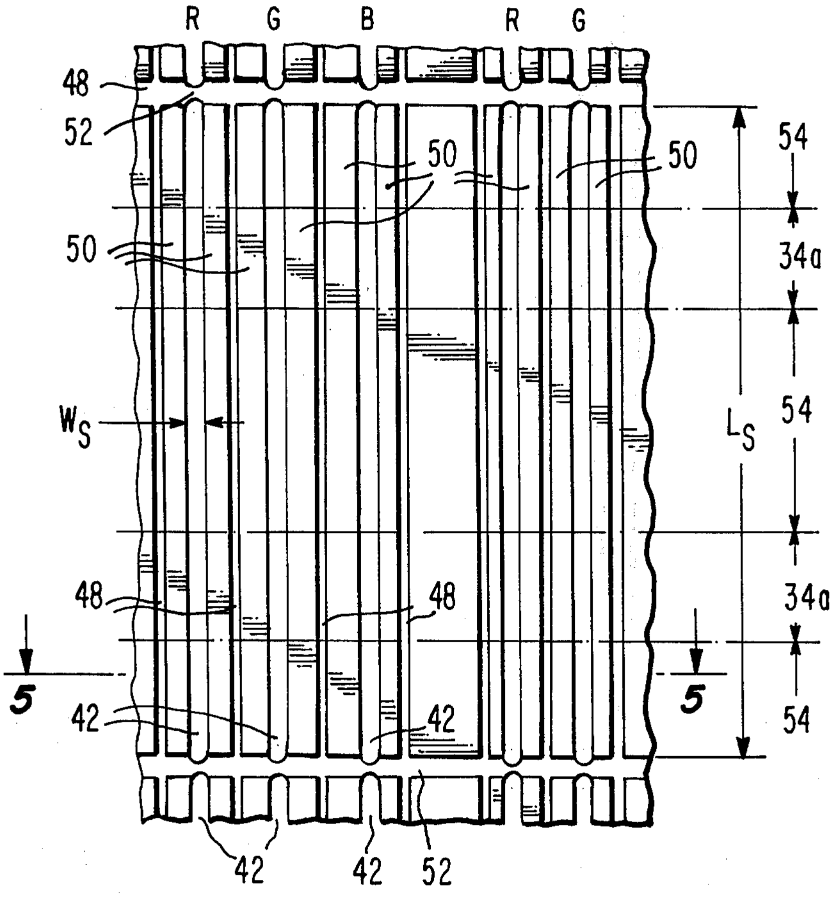
FIG. 3 is a plan view of a portion of the modulation mask taken along line 3–3 of FIG. 2.

A plurality of substantially identical charge sensing pads 50, e.g., metal contacts of aluminum, are disposed on the insulating layer 48, as can be seen more clearly in FIG. 3. The sensing pads 50 are disposed between the columns of slots 42. Each one of the slots 42 is in abutting relation with a separate pair of identical sensing pads 50. The charge sensing pads are segmented, i.e., they extend for less than the full number of rows of slots 42. In order to obtain the segmented charge sensing pads 50, it is necessry to provide sensing pad separations 52. Each of the sensing pads 50 actually completes a capacitor which comprises the metal sheet 43, the insulating layer 48 and the metal contact (sensing pad 50), as shown in FIG. 5.

Figure 4:
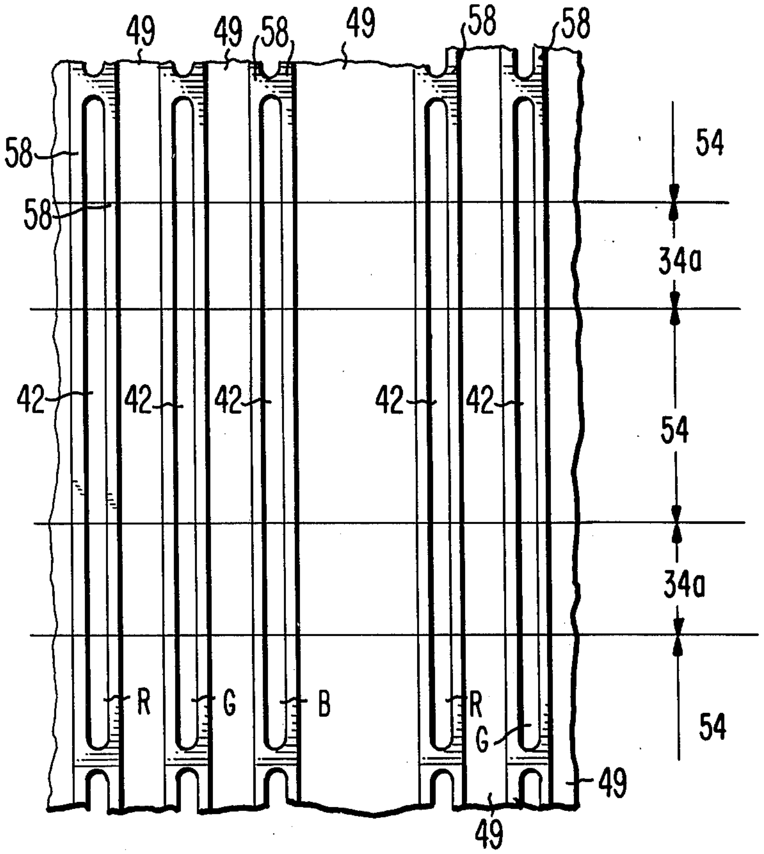
FIG. 4 is a plan view of a portion of the modulation mask taken along line 4—4 of FIG. 2.

A plurality of substantially parallel modulating electrodes 58 are disposed on the insulating layer 49 which is on the surface 46 of the metal sheet 43, as shown in FIGS. 4 and 5. Each modulating electrode 58 extends around one of the parallel columns of slots 42. In the slot 42, the modulating electrode 58 is disposed on the insulating layer 49 on the sides of the slot so as to taper away from the narrow end of the slot 42, as shown in FIG. 5. The modulating electrodes 58 should be an electrical conductor, e.g., a metal such as aluminum. In contrast to the segmented sensing pads 50, the modulating electrodes 58 extend for the full number of parallel rows of slots 42, i.e., they are not segmented, as shown in FIG. 4.

The modulating mask 36 can be constructed through area processing techniques which are capable of forming an array of capacitance pads whose dimensions and capacitances are controllable to about 1 percent. The slots 42 can be formed by embossing an aluminum sheet 43 with an emboss tool whose dimensions have been photolithographically defined. The insulating layer 48 for the sensing pads 50 can be deposited by standard evaporation or sputtering techniques. The insulating layer 49 (aluminum oxide) for the modulating electrodes 58 can be deposited on the aluminum sheet 43 through standard anodization techniques wherein the anodizing follows the embossed contours. As a result of the anodization, the surface of the aluminum is transformed into aluminum oxide. By limiting the anodization time, an insulating layer 49 of aluminum oxide can be formed which is 10 to 75 microns in thickness, as desired. Metal contacts, i.e., sensing pads 50, and the modulating electrodes 58 can then be deposited through any well known technique, e.g., evaporated, and then defined through the use of well known photolithographic techniques.

The relative orientation of the elements in the display device 10 can be further described by referring to FIGS. 3 and 7. The major axes of the the line multipliers 34*a* are in orthogonal relation to the major axes of the slots 42, as shown in FIG. 7. The output of the line multipliers 34*a* is directed toward the slots 42 and abutting sensing pads 50 with each slot 42 receiving the outputs of two consecutive line multipliers 34*a*, as shown in FIG. 3. The negative barrier potential electrodes 37*b* are in proximate relation with the slots 42 and abutting sensing pads 50, as shown in FIG. 7.

Between the outputs of each consecutive pair of line multipliers 34*a* is a multiplier dead area 54, i.e., an area where there is no output, as shown in FIG. 3. The sensing pad separations 52 are positioned to lie in the dead area 54. Consequently, the size of the sensing pad separations 52 is limited by the size of the multiplier dead area 54. Modulation mask inhomogenities can be reliably isolated in a multiplier dead area 54 even if multiplier construction or mask alignment techniques are somewhat imprecise. This means that the shape of the opposite ends of the slots 42 is not critical. For example, the ends of the slots 42 on the longitudinal axis can be rounded or square shaped. In addition, if the ends are located in the multiplier dead area 54, the shape of the ends need not be uniform, e.g., some ends can be rounded, others can be square shaped.

The operation of the modulation mask 36 of the present invention can now be described generally by referring to FIGS. 2, 6, 7 and 8.

When the mask 36 is used in conjunction with the feedback multiplier type line electron sources 34*a* previously described. a line source of electrons is provided by applying voltages to the multiplier dynodes 41. In such a case, any spurious electron emitted near the multiplier cathode 32 will be allowed to pass up through and be multiplied within the multiplier 34*a*, producing $G_m$ electrons as the multiplier output, where $G_m$ is the multiplier gain. When the surfaces or volume near the output end 35 of the line multiplier 34*a* are coated or filled with gas or fluorescent species, e.g., element 39 of FIGS. 6 and 7, gas ions or light can be formed by bombarding electrons. In such a case, a certain number of gas ions or light photons will be able to pass back through the open multiplier 34*a* and strike the multiplier cathode 32. These ions or photons can produce additional cathode electrons. If the multiplier gain $G_m$ is sufficiently large, the ions or photons created near the multiplier output end 35 (FIG. 6) by the multiplication of a single cathode electron will feedback to the cathode 32 so as to produce more than an additional cathode electron. In this manner, current at the cathode 32 and within the multiplier 34*a* will continue to grow exponentially in what is termed "regenerative feedback" leading to sustained electron emission. The output current of the line electron multiplier 34*a* will eventually cease to grow through some mechanism such as electronic space charge saturation. In this manner, the feedback multiplier 34*a* can be made to provide a line source of electrons.

As will later be described, the sensing pads 50 are provided with an initial electrical charge Q, where Q = CV. As previously described, the sensing pad 50 is on the insulating layer 48 such that the pad 50 has a predetermined capacitance (C) to the metal sheet 43. The capacitance can be charged to a desired uniform voltage level (V). Once each of the pads is charged to this level, only a substantially uniform maximum electrical charge can pass into each of the slots which are abutted by the pads as the pads are discharged.

Each time a charge is directed through a slot 42, a picture element lights up on the screen 40. The directed charge can come from the line multipliers 34*a* which perform the function of creating the electrons which illuminate each of the display elements on the screen 40. The output of the line multiplifer 34*a* causes the previously charged sensing pads 50 to discharge. These line multipliers can be referred to as DISCHARGE multipliers 34*a* since their function is to discharge the sensing pads 50. Once the sensing pads 50 are completely discharged, in order for that particular slot 42, or row of slots, to be capable of passing additional display element charge to the screen 40 at a later time, the sensing pads 50 which abut the slot 42 must be charged again, preferably to their former desired voltage level. The charging of the sensing pads 50 can be obtained through resistive leakage from the metal sheet 43 through the insulating layer 48. That is, the metal sheet 43 can be provided with a voltage of a magnitude which causes current to leak through the insulating layer 48. The result is that the sensing pads 50 reach the voltage of the metal sheet 43 and are consequently charged, i.e., Q = CV. This means that when the metal sheet 43 is provided with a predetermined electrical potential, the sensing pads 50 can be electrically charged to the same electrical potential as a result of resistive leakage through the insulating layer 48.

Referring now to FIGS. 6 and 7, the invention can be more fully described. Assuming the sensing pads 50 to be initially charged to the uniform desirable voltage level, the description will begin with the operation of the DISCHARGE multipliers 34*a*. Electrons (*e*—) leave the final dynode member 41 and high energy electrons are filtered out, e.g, through the use of the high energy electron filter 66, shown in FIG. 6. High energy electrons cannot pass through the filter 66 since there is no straight path therethrough. Although high energy electrons from the electron multiplier 34*a* are eliminated by the filter 66, lower enegy secondary emission electrons created on the target electrodes 37*t*, which are at a potential of $V_t$, are selectively extracted and accelerated towards the mask 36 by extract electrodes 37*c* having positive voltages $V_{P1}$, $V_{P2}$ and $V_{P3}$, as shown in FIG. 7. As employed herein, all electrical potentials are described in reference to the target voltage $V_t$, which is normally at ground potential (0 volts).

Figure 8:
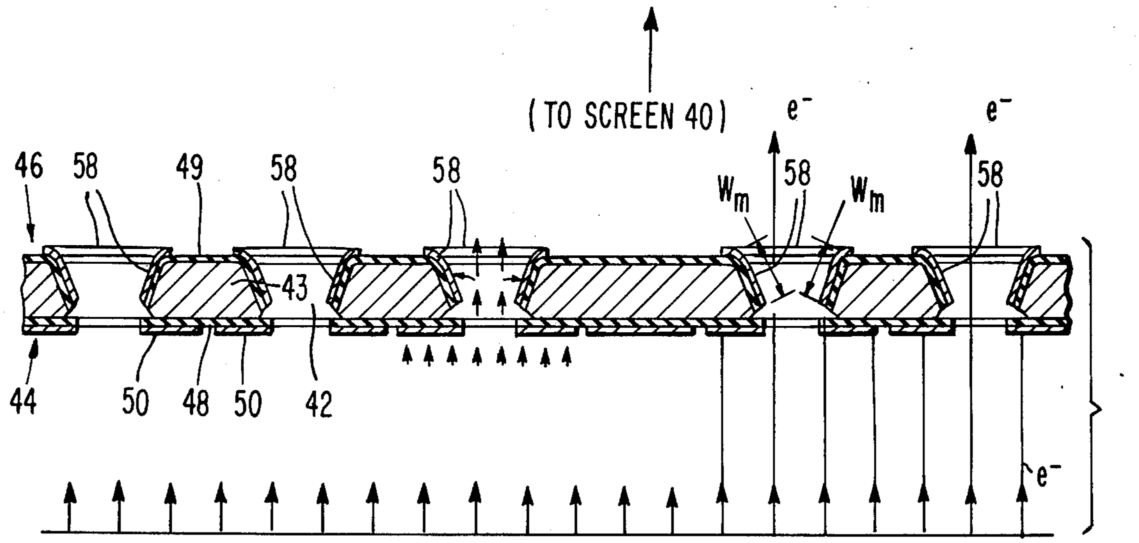
FIG. 8 is a cross-sectional view of the modulation mask taken as in FIG. 5 showing the mechanism by which charge sensing and modulation is accomplished by the modulation mask of the present invention.

A negative voltage $V_b$, e.g., −5 volts, is applied to the negative barrier potential electrodes 37*b* in the DISCHARGE multiplier 34*a*. The electrons are initially drawn through the negative barrier voltage $V_b$ with some striking the abutting sensing pads 50 and some passing through the slots 42 toward the screen 40, as shown in FIG. 8. The electrodes 37*b* which provide the negative barrier voltage ($V_b$) prevent any secondary electrons from escaping from the portions of the sensing pads 50 which abut the slot 42 so the pads 50 will charge negatively until the current passing the negative barrier electrodes 37*b* is asymptotically cut off.

Even an asymptotic cut-off of the current is sufficient to insure that each region of the modulation mask along the multiplier line source is exposed to enough charge so as to drive its sensing pads to the common cutoff voltage. However, it is necessary that the multiplier line source be kept reasonably uniform, through, for example, space charge limitation of the line source current prior to passing through the high energy electron filter 66. Thus, when the sensing pads become sufficiently negative, i.e., at cutoff voltage, substantially no more electrons can pass into each slot. The same principle of operation applies to the complete display device which includes a plurality of multiplier line sources.

It should be noted that the optically opaque high energy electron filter is necessary when using the mask 36 with a secondary emission line source, e.g., feedback multiplier, because secondary emission cathodes typically produce electrons with energies which are quite high. The discharging sensing pads 50 discharge asymptotically to the negative energy of the most energetic source electron so that the final pad voltage may be quite uncertain if these high energy electrons are not filtered.

Since, as previously mentioned, the planar modulation mask 36 may be constructed using area processing techniques including, for example, photolithography, the slot widths, sensing pad areas and insulator thicknesses can all be held accurate to within about 1 percent. Thus, one can insure that the capacitances formed by the sensing pad, insulating layer, and metal sheet can be held uniform to about 1 percent. One can also insure that the slots sample a constant fraction of the current sampled by the pads. By additionally insuring that both the initial voltage to which the pads are charged and final voltage to which they discharge varies by less than about 1 percent from pad to pad, one may achieve a situation in which the charge transmitted by the unmodulated slots varies by less than about 1 percent element to element.

The description will now continue with the mechanism employed to recharge the now discharged sensing pads. As previously stated, the discharged sensing pads are charged by leakage from the metal sheet 43 through the sensing pad insulating layer 48. The insulating layer 48 on which the sensing pads 50 are disposed performs two functions. During discharge of the sensing pads 50, i.e., display, the insulating layer 48 functions as an ideal insulating dielectric. That is, the insulating layer 48 determines the capacitance between the sensing pads 50 and the metal sheet 43. During charging of the sensing pads, the insulating layer 48 functions as a resistive material capable of leaking electrical charge therethrough.

In order to provide a desirable display, relatively fast operation of the sensing pads may be required. For example, it may be necessary that the sensing pads 50 be charged and discharged in less than one-sixtieth of a second. In such a case, it is necessary to provide sensing pads on insulating layers 48 which exhibit capacitances with respect to the metal sheet 43 which are compatible with voltage and charge requirements of the particular display and which can leak off charge within the desired times. The previously described pad insulating layer 48 which was of a material having a resistivity of between about $10^6$ ohm-cm to about $10^{11}$ ohm-cm, such as aluminum nitride, would be suitable for fast operation.

Referring now to FIGS. 3 and 7, since the charge sensing pads 50 extend through the ouput of two consecutive line multipliers 34*a*, the pads 50 can be discharged by the output of one of the two line multipliers 34*a* thereby creating a portion of the display on the screen 40. If conventional television type interlacing of the display image is employed, the now discharged sensing pads 50 have a full field time to be charged back to the common level. That is, before the remaining line multiplier 34*a* is operated to discharge the pads, i.e., the next field is entered, the sensing pads 50 leak back to the voltage, i.e., electrical potential, of the metal sheet 43. Consequently, the structures shown in FIGS. 3 and 7 are particularly desirable.

Having created a substantially uniform maximum charge source through the use of space charge limitation and segmented charge sensing pads 50, it is now possible to use voltage control of relatively low magnitudes to modulate the substantially uniform charge packets which pass into each slot 42, i.e., to obtain gray scale. The voltage control may be analog in operation and will consist of applying an appropriate voltage to each modulating electrode 58 which extends around one of the columns of slots 42. For example, an applied voltage varying by up to 50 volts would be suitable for producing the desired analog modulation for a satisfactory display. As shown in FIG. 8, the modulating electrodes 58 function to allow only a desired fraction of the electrons, which have reached the slots 42, to pass out of the slots 42 and continue toward the screen 40. Also, it can now be observed that secondary emission from the modulating electrodes 58 is substantially prevented due to the manner in which the electrodes 58 slope away from the slot 42 therebetween. Furthermore, the voltage necessary to effectively modulate the electrons, which pass into and through the slots, is minimized by keeping the width ($W_m$) i.e., in the slot 42, of the modulating electrodes 58 as large as possible.

Although the modulation mask 36 of the present invention has been described as having a particular structure, other variations are possible and in certain instances, may even be preferable. For example, it is not always necessary that the sensing pads be substantially identical, especially in area. As previously described, each of the identical sensing pads were exposed to substantially the same length of multiplier output, i.e., along the major axis of the line multiplier.

However, it is permissible for one sensing pad to have a greater width than another pad as long as the one pad intercepts a correspondingly greater length of multiplier output and as long as the one pad exhibits a correspondingly greater capacitance. That is, it is desirable to keep constant the ratio of the width of the pad to the capacitance of the pad.

Figure 9:
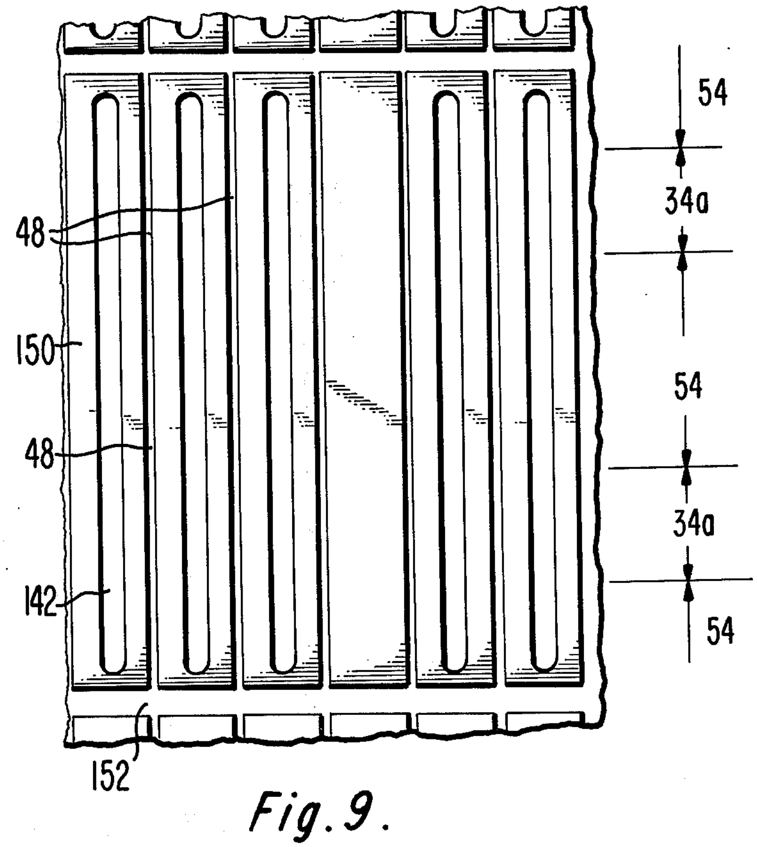
FIGS. 9 and 10 are plan views taken as in FIG. 3 showing a portion of other forms of modulation masks of the present invention in which the number of sensing pads is reduced.
Figure 10:
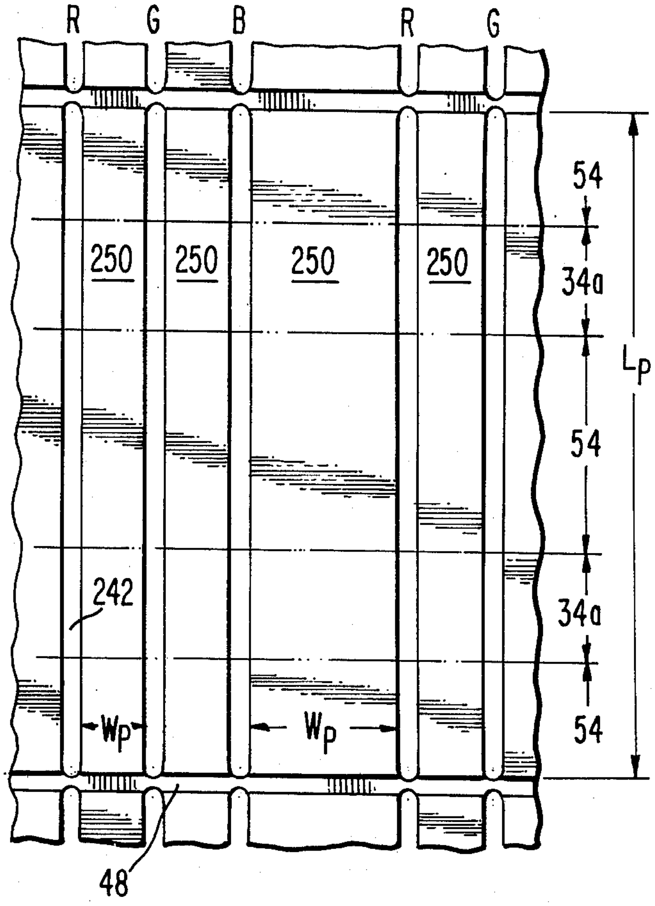

Two variations of the previously described modulation mask 36 are shown in FIGS. 9 and 10. The modulation masks shown partially in FIGS. 9 and 10 include a reduced number of sensing pads as compared to the structure shown in FIGS. 3–5. For example, in FIG. 9, each of the slots 142 is in abutting relation with a single sensing pad 150 which surrounds the slot. In FIG. 10, the sensing pads 250 are not identical, but they exhibit a constant ratio of pad width ($W_p$) to pad capacitance. The structure shown in FIG. 10 minimizes the regions where the pad insulating layer 48 is exposed to the output of the multiplier 34*a*. This may be desirable since the charging of insulators often leads to unpredictable results.

Figure 11:
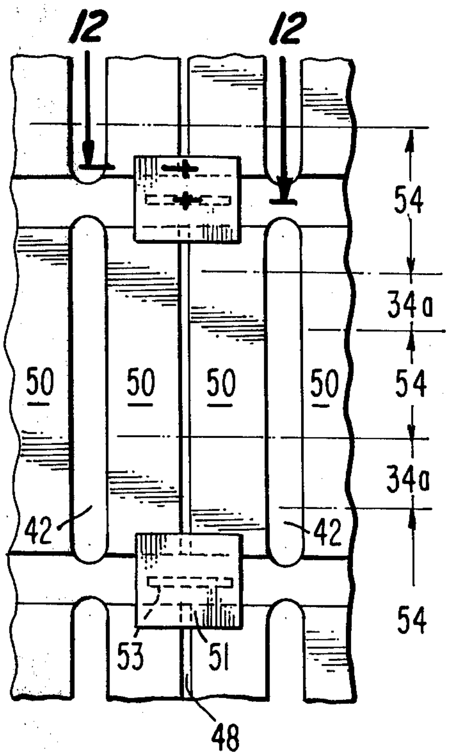
FIG. 11 is a plan view of a portion of another form of modulation mask of the present invention taken as in FIG. 3.
Figure 12:
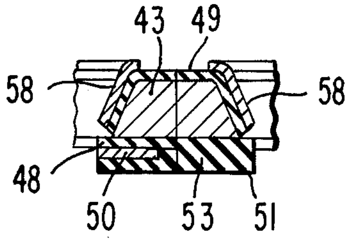
FIG. 12 is an enlarged sectional view taken along line 12—12 of FIG. 11.

For some applications, it may be desirable to increase the number of materials which can be employed to provide the previously described resistive leakage function. One such embodiment is partially shown in FIGS. 11 and 12. The sensing pads 50 and modulating electrodes 58 are disposed on insulating layers which are substantially the same, e.g., each is disposed on layers 48 and 49 of aluminum oxide. However, since aluminum oxide is such a good insulator, in order to provide the previously described resistive leakage function, the sensing pads 50 must be electrically connected to the metal sheet 43 through a body of resistive material. For example, the resistive body can be in the form of a resistive layer 51, as shown in FIG. 11. The resistive layer 51 is disposed in the multiplier dead area 54. The resistive layer 51 is electrically connected to the sensing pads 50 by its deposition thereon. The resistive layer 51 is electrically connected to the metal sheet 43 by removing a strip of the pad insulating layer 48. In such a case, the resistive layer 51 is electrically connected to the metal sheet 43 through a contact portion 53. If desired, the resistive body 51 can be electrically connected to the metal sheet 43 by its deposition thereon, i.e., the resistive layer 51 can be sandwiched between the metal sheet 43 and the sensing pads 50 (not shown). Through conventional masking techniques, the resistive layer 51 can be electroded to the metal sheet in resistive strips whose area and thickness may be varied to give the specific resistive leakage desired. For example, the resistive strips 51 can be as narrow as 25 microns and as thin as 1000 A. Thus, although the resistive layer 51 is shown in FIGS. 11 and 12 overcoating a particular area in the multiplier dead area 54, other variations are possible. The geometry shown in FIGS. 11 and 12, and its variations, considerably broadens the number of resistive materials which can be utilized, as compared to the structure shown in FIGS. 3–5. That is, materials having resistivities between about $10^0$ ohm-cm to about $10^6$ ohm-cm can now be utilized.

It should be noted that the charging of the sensing pads need not be accomplished by resistive leakage to the electrical potential of the modulation mask metal sheet. The sensing pads can be charged via resistive leakage to any body having the predetermined electrical potential. For example, the sensing pads can be electrically connected through a resistive leakage path to a nearby body which is provided with the predetermined electrical potential (not shown). This can be accomplished by providing an electrode for each row of the sensing pads. These electrodes can be conveniently disposed in the dead area of the mask, i.e., the area where there is no multiplier output. Furthermore, the charging of the sensing pads need not be performed through resistive leakage to a predetermined electrical potential. Other charging means can be utilized, e.g., charging through secondary emission.

In addition, it is not essential that each row of slots in the modulation mask constitute two consecutive lines of display information, or that each sensing pad extend through only one row of slots. Many variations are possible, although it is always necessary that the sensing pads extend for less than the full number of rows of slots so as to minimize the capacitance of each sensing pad. Thus, the sensing pads could extend for more or less than two lines of display information. However, an increased length of the sensing pad results in a higher capacitance for a given pad insulating layer. Also, when the sensing pad extends through a distance which includes an increased number of display lines, the result is that the sensing pad must be capable of faster charging for a given operation as compared to a sensing pad which extends through fewer display lines. That is, when the sensing pad functions to sense charge from more than two consecutive display lines, it will be necessary to recharge more often, e.g., more often than once each field time one-sixtieth of a second). This recharging rate is necessary for displays in which information is displayed in television rate interlace fashion.

An important advantage of the present invention is that the separation of the charge sensing and modulation functions in the modulation mask permits the charge sensing electrodes to be segmented into lengths which are much smaller than the full number of rows of slots, i.e., lengths which are much smaller than the full image height, while still providing for modulation. Consequently, sensing pad capacitances are reduced such that stringent control can be achieved without demanding an excessive amount of line source charge.

Although the modulation mask of the present invention has been described in use in flat image display device which employs a feed back mechanism, i.e., ion and/or photon feedback in conjunction with electron multipliers, it is apparent that the modulation mask of the present invention can be utilized to modulate and insure uniformity with other types of line electron sources. Further, although the modulation mask has been described as having slot shaped apertures, other aperture shapes may be employed, e.g., circular or square shaped apertures. Thus, there is provided by the present invention, a modulation mask suitable for use in an area cathode cathodoluminescent flat image display device. The modulation mask can be used to produce a display having desirable characteristics.

I claim:

1. A substantially planar modulation mask for an area cathode cathodoluminescent image display device, which comprises:

a metal sheet having a plurality of substantially identical apertures which are disposed in parallel rows and columns, a plurality of segmented charge sensing pads disposed on but insulated from one surface of said metal sheet with at least one of said sensing pads in abutting relation with each of said apertures, each one of said sensing pads being disposed between said columns of apertures and extending for less than the full number of said rows of apertures, and a plurality of substantially parallel modulating electrodes disposed on but insulated from the other surface of said metal sheet with each one of said modulating electrodes extending around one of said parallel columns of apertures.

2. A modulation mask in accordance with claim 1 in which said apertures are slot shaped with the major axes of said slots disposed along said columns.

3. A modulation mask in accordance with claim 2 in which each slot is in abutting relation with a separate pair of said sensing pads with said slot being included between said pair of sensing pads.

4. A modulation mask in accordance with claim 2 in which each of said slots is in abutting relation with a single sensing pad which surrounds said slot.

5. A modulation mask in accordance with claim 2 in which each of said slots has a narrow end at said one surface of said metal sheet and a wide end at said other surface with sides which taper away from said narrow end, said modulating electrode being disposed on said sides.

6. A modulation mask in accordance with claim 2 in which said sensing pads are insulated from said metal sheet by an insulating layer, said insulating layer being of a material such that resistive leakage of the electrical potential of said metal sheet occurs therethrough.

7. A modulation mask in accordance with claim 6 in which said insulating layer on which said sensing pads are disposed has a resistivity of between about $10^6$ ohm-cm to about $10^{11}$ ohm-cm.

8. A modulation mask in accordance with claim 7 in which said insulating layer on which said sensing pads are disposed comprises aluminum nitride.

9. A modulation mask in accordance with claim 2 in which said sensing pads are electrically connected to said metal sheet through a body of material having a resistivity of less than about $10^6$ ohm-cm.

10. A modulation mask in accordance with claim 2 in which said metal sheet comprises aluminum.

11. A modulation mask in accordance with claim 10 in which said modulating electrodes are insulted from said metal sheet by a region of anodized aluminum.

12. An image display device which includes line sources of electrons, means for modulating a flow of electrons from said line sources, means for accelerating and focussing said modulated flow of electrons, and a cathodoluminescent screen excitable by the modulated and accelerated flow of electrons, wherein said means for modulatng said flow of electrons includes a substantially planar modulation mask, which comprises:

a metal sheet having a plurality of substantially identical apertures which are disposed in parallel rows and columns, a plurality of segmented charge sensing pads disposed on but insulated from one surface of said metal sheet with at least one of said sensing pads in abutting relation with each of said apertures, each one of said sensing pads being disposed between said columns of apertures and extending for less than the full number of said rows of apertures, said one surface of said metal sheet facing said line sources of electrons, and a plurality of substantially parallel modulating electrodes disposed on but insulated from the other surface of said metal sheet with each one of said modulating electrodes extending around one of said parallel columns of apertures.

13. An image display device in accordance with claim 12 in which said apertures are slot shaped with the major axes of said slots disposed along said columns in orthogonal relation to said line sources.

14. An image display device in accordance with claim 13 in which said sensing pads are in abutting relation with said slots for at least the length of said slots which are exposed to said electron flow from said line electron sources.

15. An image display device in accordance with claim 14 in which each slot is in abutting relation with a separate pair of said sensing pads with said slot being included between said pair of sensing pads.

16. An image display device in accordance with claim 14 in which each of said slots is in abutting relation with a single sensing pad which surrounds said slot.

17. An image display device in accordance with claim 13 in which each of said slots has a narrow end at said one surface of said metal sheet and a wide end at said other surface with sides which taper away from said narrow end, said modulating electrode being disposed on said sides.

18. An image display device in accordance with claim 13 in which said screen includes a plurality of substantially parallel phosphor stripes with each one of said slots being aligned with one of said phosphor stripes.

19. A image display device in accordance with claim 13 in which said sensing pads are insulated from said metal sheet by an insulating layer, said insulating layer being of a material such that resistive leakage of the electrical potential of said metal sheet occurs therethrough.

20. A image display device in accordance with claim 19 in which said insulating layer on which said sensing pads are disposed has a resistivity of between about $10^6$ ohm-cm to about $10^{11}$ ohm-cm.

21. A image display device in accordance with claim 20 in which said insulating layer on which said sensing pads are disposed comprises aluminum nitride.

22. A image display device in accordance with claim 13 in which said sensing pads are electrically connected to said metal sheet through a body of material having a resistivity of less than about $10^6$ ohm-cm.

23. A image display device in accordance with claim 13 in which said metal sheet comprises aluminum.

24. A image display device in accordance with claim 23 in which said modulating electrodes are insulated from said metal sheet through regions of anodized aluminum.

25. An image display device in accordance with claim 13 in which each of said line electron sources includes a plurality of electrodes extending parallel to the major axes of said line electron sources with some of said electrodes being potential barrier electrodes, said potential barrier electrodes being in proximate relation to said sensing pads such that secondary electrons can be substantially prevented from escaping from said sensing pads.

26. An image display device in accordance with claim 25 in which said line sources of electrons include line electron multipliers open to feedback of sufficiently high gain to produce regenerative feedback and sustained electron emission.

27. An image display device in accordance with claim 26 in which each of said sensing pads is exposed to the output of at least one of said line multipliers, each of said line multipliers including an optically opaque high energy electron filter, said filter being disposed between the output of said line multiplier and said modulation mask.

28. An image display device in accordance with claim 27 in which each of said sensing pads is exposed to the output of a consecutive pair of said line multipliers.

* * * * *